(12) United States Patent
Langer

(10) Patent No.: US 7,895,789 B2
(45) Date of Patent: Mar. 1, 2011

(54) PLIABLE SPINNING APPENDAGES AND ATTACHMENTS FOR FISHING LURES

(76) Inventor: Alexander G. Langer, Boston, MA (US)

( * ) Notice: Subject to any disclaimer, the term of this patent is extended or adjusted under 35 U.S.C. 154(b) by 1010 days.

(21) Appl. No.: 11/472,821

(22) Filed: Jun. 22, 2006

(65) Prior Publication Data

US 2008/0202015 A1   Aug. 28, 2008

Related U.S. Application Data

(60) Provisional application No. 60/692,923, filed on Jun. 22, 2005.

(51) Int. Cl.
*A01K 85/12* (2006.01)
(52) U.S. Cl. ............ 43/42.11; 43/42.28; 43/42.15; 43/42.09
(58) Field of Classification Search ........... 43/42.13, 43/42.11, 42.28, 42.3, 42.19, 42.12, 42.14, 43/42.09, 42.24, 42.15, 42.16, 42.18, 42.26, 43/42.46, 42.2, 42.51
See application file for complete search history.

(56) References Cited

U.S. PATENT DOCUMENTS

| | | | | |
|---|---|---|---|---|
| RE17,955 E * | 2/1931 | Arbogast | ............ | 43/42.16 |
| 1,871,387 A * | 8/1932 | Pflueger | ............ | 43/42.36 |
| 2,494,407 A * | 1/1950 | Rhodes | ............ | 43/42.05 |
| 2,504,229 A * | 4/1950 | Sinclair | ............ | 43/42.13 |
| 2,545,398 A * | 3/1951 | Warobiew | ............ | 43/42.16 |
| 2,555,802 A * | 6/1951 | Martin | ............ | 43/26.2 |
| 2,821,044 A * | 1/1958 | Bateman | ............ | 43/42.16 |
| 3,017,716 A * | 1/1962 | Hawks | ............ | 43/42.16 |
| 3,172,227 A * | 3/1965 | Mackey | ............ | 43/42.09 |
| 3,624,950 A * | 12/1971 | Merckes | ............ | 43/44.2 |
| 3,905,149 A * | 9/1975 | McCloud | ............ | 43/44.2 |
| 3,958,358 A | 5/1976 | Firmin | ............ | 43/42.51 |
| 4,133,135 A * | 1/1979 | Miles | ............ | 43/42.13 |
| 4,257,183 A | 3/1981 | Arms | ............ | 43/42.19 |
| 4,530,179 A | 7/1985 | Larew | ............ | 43/42.06 |
| 4,777,758 A * | 10/1988 | Phillips | ............ | 43/42.09 |
| 4,831,767 A * | 5/1989 | Pearce | ............ | 43/26.2 |
| 4,845,883 A | 7/1989 | Langer | ............ | 43/42 |
| 4,850,132 A * | 7/1989 | Motyka | ............ | 43/44.2 |
| 4,873,782 A * | 10/1989 | Gudermuth, Jr. | ............ | 43/42.15 |
| 5,042,189 A * | 8/1991 | Bailey | ............ | 43/42.09 |
| 5,070,639 A * | 12/1991 | Pippert | ............ | 43/42.31 |
| 5,121,567 A | 6/1992 | Boone | ............ | 43/42.24 |
| 5,353,540 A * | 10/1994 | Ward | ............ | 43/42.24 |
| 5,522,170 A * | 6/1996 | Cole | ............ | 43/42.11 |
| 5,630,289 A * | 5/1997 | Dotson | ............ | 43/42.09 |
| 5,647,163 A * | 7/1997 | Gorney | ............ | 43/42.13 |
| 5,930,941 A * | 8/1999 | Hayes, II et al. | ............ | 43/42.13 |
| 6,131,328 A * | 10/2000 | Menne | ............ | 43/42.22 |
| 6,141,900 A * | 11/2000 | Rudolph | ............ | 43/42.24 |

(Continued)

FOREIGN PATENT DOCUMENTS

DE       19936914 A1 * 12/2000

(Continued)

*Primary Examiner* — Joshua J Michener

(74) *Attorney, Agent, or Firm* — Weingarten, Schurgin, Gagnebin & Lebovici LLP

(57) ABSTRACT

Soft or pliable spinning appendages can be attached to any fishing lure, hard or soft, using a swivel mechanism that provides unrestricted 360° rotation. The appendages increase attractiveness, flash, vibration, color, or scent. Due to their slow spinning speed and neutral buoyancy in water, the appendages provide unique properties to slow-moving lures not possible with prior art hard blades. A weedless swivel mechanism is also provided.

37 Claims, 17 Drawing Sheets

U.S. PATENT DOCUMENTS

| | | | |
|---|---|---|---|
| 6,182,390 B1 * | 2/2001 | Watkins | 43/42.31 |
| 6,240,672 B1 * | 6/2001 | Huppert | 43/44.8 |
| 6,301,823 B1 * | 10/2001 | Monticello et al. | 43/42.5 |
| 6,516,553 B1 * | 2/2003 | King | 43/42.16 |
| 6,536,155 B1 * | 3/2003 | VanRisseghem | 43/42.13 |
| 6,601,336 B1 * | 8/2003 | Link | 43/42.13 |
| 6,637,147 B2 | 10/2003 | Ooten | 43/42.19 |
| 6,748,692 B2 * | 6/2004 | Sprouse | 43/42.13 |
| 6,857,220 B2 * | 2/2005 | King | 43/42.28 |
| 7,010,881 B2 * | 3/2006 | Altman | 43/42.13 |
| 7,080,476 B2 * | 7/2006 | King | 43/42.28 |
| 7,493,724 B1 * | 2/2009 | Peterson | 43/42.03 |
| 2002/0194770 A1 * | 12/2002 | King | 43/42.24 |
| 2008/0115402 A1 * | 5/2008 | Helmin | 43/42 |

FOREIGN PATENT DOCUMENTS

| | | | |
|---|---|---|---|
| FR | 2684844 A1 * | 6/1993 | |
| WO | WO 9419936 A1 * | 9/1994 | |
| WO | WO 9730584 A1 * | 8/1997 | |

* cited by examiner

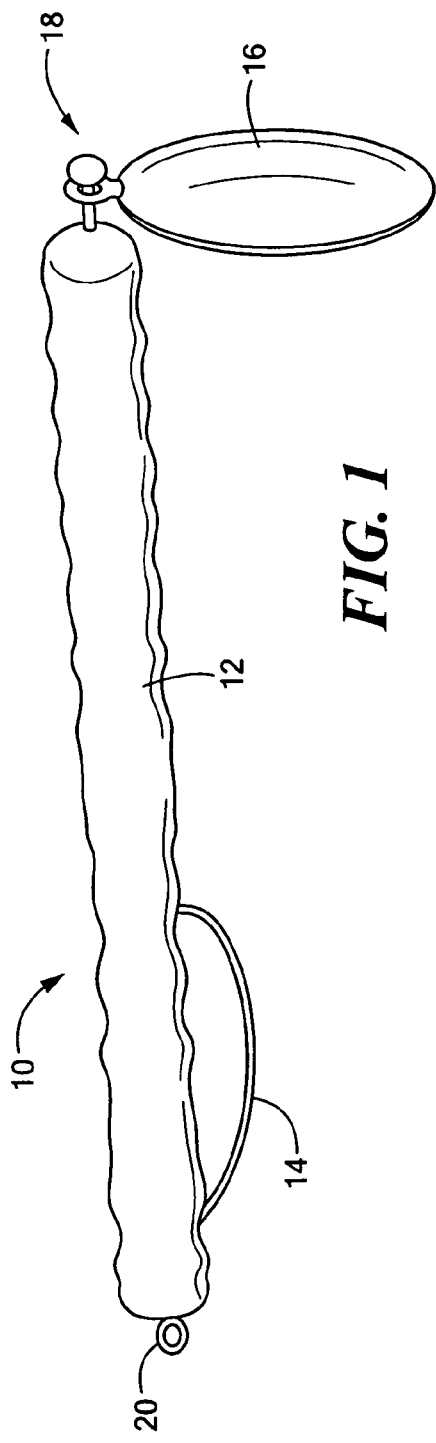
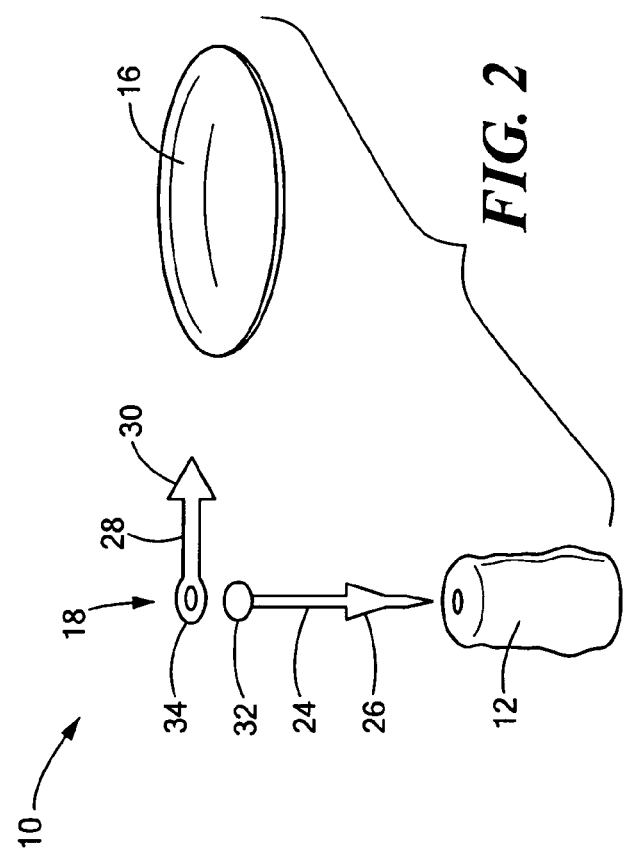

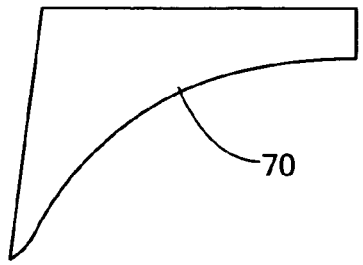 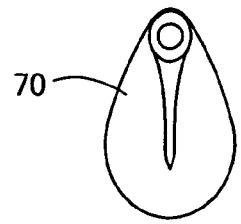
*FIG. 9A*         *FIG. 9B*
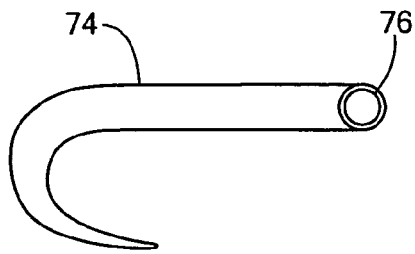 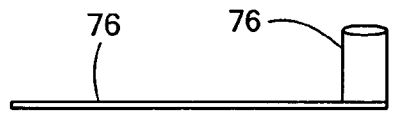
*FIG. 10A*         *FIG. 10B*
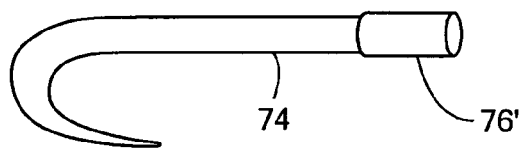
*FIG. 10C*
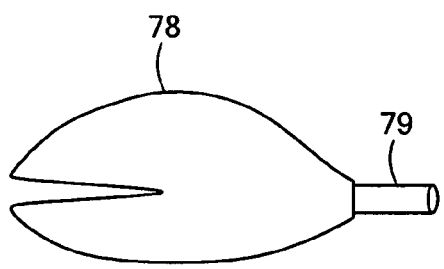 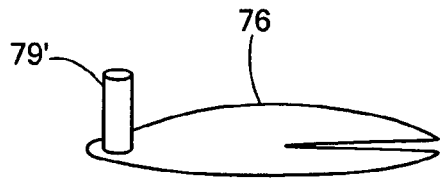
*FIG. 11A*         *FIG. 11B*

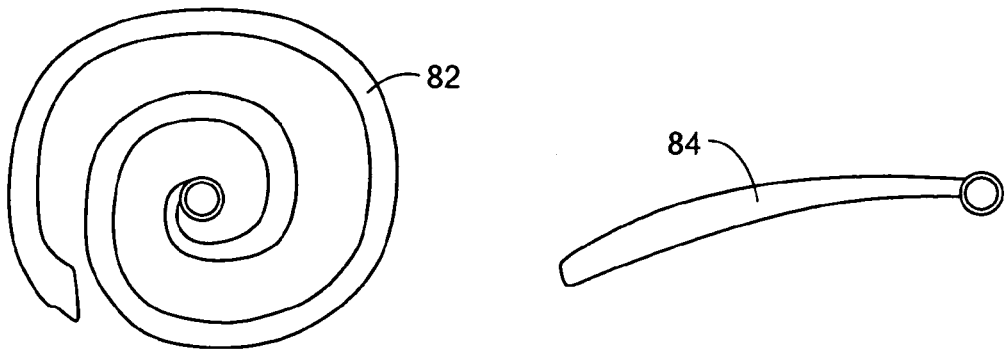
FIG. 12
FIG. 13A
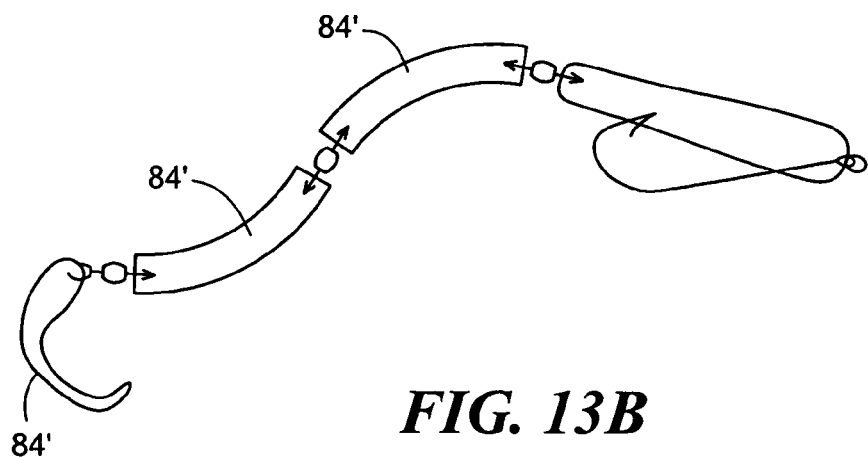
FIG. 13B
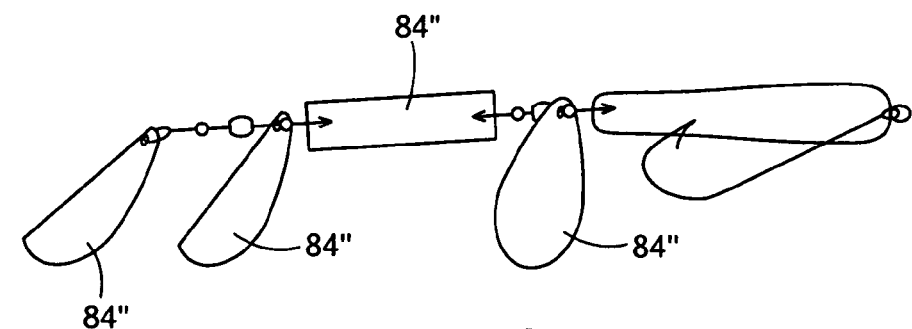
FIG. 13C

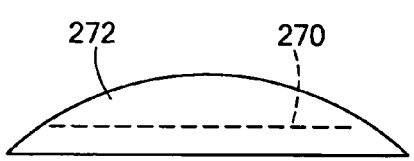
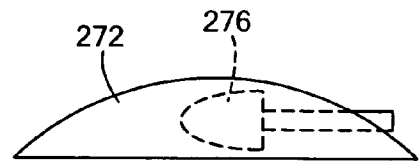
FIG. 35  FIG. 36
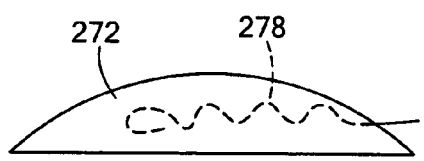
FIG. 37
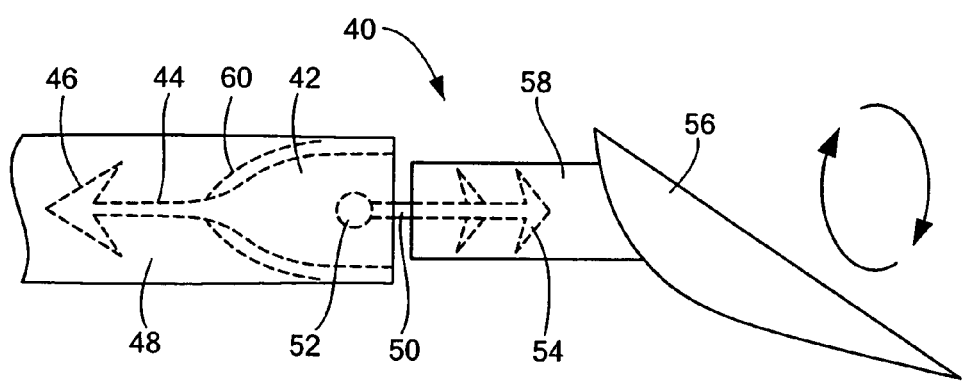
FIG. 38
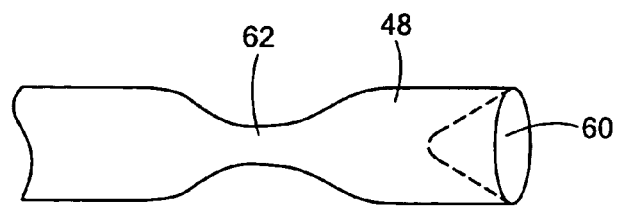
FIG. 39

PLIABLE SPINNING APPENDAGES AND ATTACHMENTS FOR FISHING LURES

CROSS REFERENCE TO RELATED APPLICATIONS

This application claims the benefit under 35 U.S.C. §119(e) of U.S. Provisional Patent Application No. 60/692,923, filed on Jun. 22, 2005, the disclosure of which is incorporated by reference herein.

STATEMENT REGARDING FEDERALLY SPONSORED RESEARCH OR DEVELOPMENT

N/A

BACKGROUND OF THE INVENTION

In fishing, spinners and spinning lures are used to attract fish. They consist of a lure with attached metal blades that spin about a wire axis or a 360° swivel. Blades are generally convex on one side and concave or flat on the other. Blades were originally known as "spinning spoons" and resemble a spoon shape attached to a swivel at one end. Blades are commonly made of metal, but have been known to be made of hard plastic or even wood.

Conventional blades made of metal are generally used in continuously-retrieved, relatively fast-moving lures such as in-line (Mepps-type) spinners, spinnerbaits, and the like. They are seldom used on slower-moving or bottom bouncing lures such as Skirted "Flipping" Jigs, Texas-rigged plastic worms, tube lures (unless these soft lures are rigged as a trailer to a spinner or buzzer, intended to be more or less continuously retrieved) for several reasons. Conventional metal blades need constant forward reeling motion or a free-fall weighted by a lure much heavier than the metal blade, to spin freely, because they are generally much heavier than water. They require the bait to move forward relatively quickly. Therefore they do not work well with slow-moving baits or lures that start and stop frequently.

Also, conventional metal blades are hard and rotate quickly. These blades are generally located in front of or away from the hook point, even when they adorn a soft swimming lure (such as the tiny propellers ahead of a pre-rigged swimming plastic worm). Otherwise, fish would be struck on the nose or mouth as they bite them and reject the bait, as often happens with spinnerbaits.

A number of pliable lures that spin are known. In one example, surgical tubing is trolled with a lead line on a swivel or behind a weight. In another example, a "balled up" plastic worm is rigged in such a manner as to put a bend in the worm by threading the plastic worm partially up the bend of a hook. These worm rigs spin in the water and are usually trolled or cast with a swivel connecting the lure to the fishing line. U.S. Pat. No. 5,353,540 discloses a three-bladed pliable propeller that spins on its axis and is connected to the fishing line with a swivel.

These spinning lures are disadvantageous in that the entire lure spins. This can lead to line twist, because there is no portion of the lure attached to the line that does not spin. The "non-spinning" portion of the fishing rig is not the lure itself, but a sinker or swivel of some sort, which is often not enough to stop the line from twisting. Also, spinning lures can easily foul in weeds, because the leading portion of the lure instantly picks up weeds and spins them around its axis.

SUMMARY OF THE INVENTION

The present invention provides soft or pliable spinning appendages for fishing lures whether they are hard or soft bodied. The appendages can be attached to any fishing lure, hard or soft, using a variety of swivel mechanisms. The appendages can take a variety of configurations and may include a weedless connecting portion. They can increase attractiveness, flash, vibration, color, or scent, depending on the type of appendage. Due to their slow spinning speed and (near) neutral buoyancy in water, the pliable appendages provide unique properties to slow-moving lures not possible with prior art hard blades. Also, a weedless swivel mechanism is provided.

DESCRIPTION OF THE DRAWINGS

The invention will be more fully understood from the following detailed description taken in conjunction with the accompanying drawings in which:

FIG. 1 is a schematic illustration of a lure assembly incorporating a pliable appendage according to the present invention;

FIG. 2 is an exploded view of the lure assembly of FIG. 1;

FIG. 9A is a side view of a swimbait-style tail appendage having a connecting portion;

FIG. 9B is a plan view of the appendage of FIG. 9A;

FIG. 10A is a plan view of a sickle configuration appendage having a connecting portion at an angle;

FIG. 10B is a side view of the appendage of FIG. 10A;

FIG. 10C is a plan view of a sickle configuration appendage having an in-plane connecting portion;

FIG. 11A illustrates a crawfish claw style appendage with an in-plane connecting portion;

FIG. 11B illustrates a crawfish claw style appendage with an angled connecting portion;

FIG. 12 illustrates a helical appendage;

FIG. 13A illustrates a curved worm tail appendage;

FIG. 13B illustrates multiple in-line spinning appendages to provide a worm- or snake-like appearance;

FIG. 13C illustrates a further arrangement of multiple spinning appendages;

FIG. 35 illustrates a blade appendage with an insert;

FIG. 36 illustrates a blade appendage with an inserted weight;

FIG. 37 illustrates a blade appendage with an inserted wire;

FIG. 38 illustrates a swivel mechanism according to the present invention;

FIG. 39 illustrates a soft lure having a recess for the swivel mechanism of FIG. 38;

DETAILED DESCRIPTION OF THE INVENTION

The present invention relates to pliable or soft spinning appendages that can be affixed to soft lures or hard lures for fishing. Such appendages can take many configurations, including spinners, buzzers or propellers, spinning tails, curved appendages, or any configuration that continuously spins upon lure movement through the water.

Figure 3:
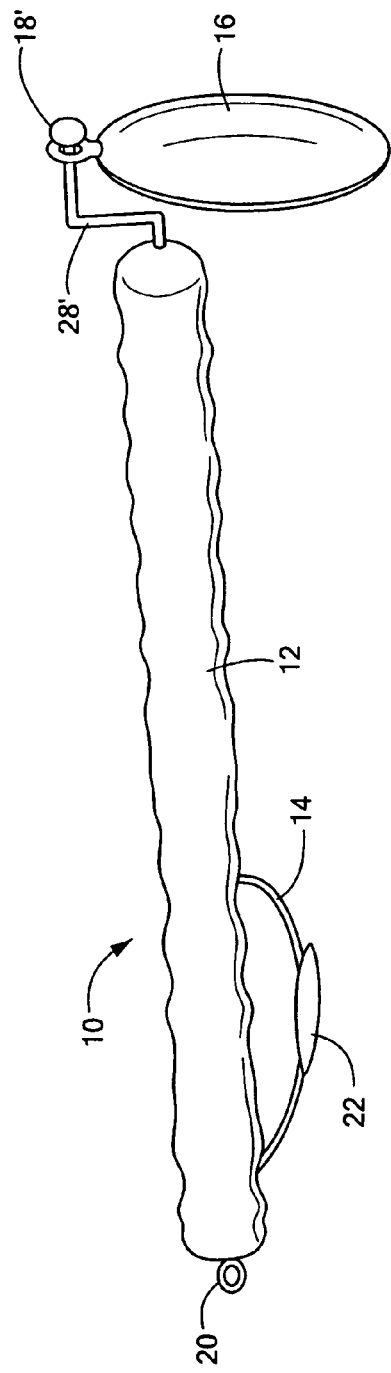
FIG. 3 is a schematic illustration of a further embodiment of lure assembly incorporating a pliable appendage.

In a first embodiment, illustrated in FIGS. 1 and 2, a fishing lure assembly 10 includes a soft plastic lure 12, in the form of a worm with an embedded hook 14, and a soft or pliable spinning appendage 16. In the embodiment shown, the appendage is in the form of a blade. The pliable blade is attached to one end of the lure with a swivel mechanism 18 that allows unrestricted 360° rotation (discussed further below). The eye 20 of the hook protrudes from the other end of the lure for non-spinning attachment of the fishing line. FIG. 3 illustrates a similar embodiment in which the swivel mechanism 18' includes an offset and the hook is weighted with a weight 22, reducing the tendency of the lure to spin. Soft blades used as a trailer behind a lure or hook are advantageous, because fish will bite them and hang on, just as they bite a plastic worm and hold on until the angler can set the hook.

The soft, non-rigid material from which the pliable appendage is formed should be soft or thin enough to be compressible and deformable by the jaws of a fish or between two fingers of any average human hand. Suitable materials may include a plastisol, such as vinyl plastisol, cyberflex, or a pliable foam. Other materials can be used, such as a suitably shaped soft pork rind, fabric, a synthetic material such as TYVEK®, or any other material soft or thin enough to be suitably compressible and deformable.

The soft or pliable spinning appendages of the present invention are advantageous for a number of reasons. Soft appendages are generally neutrally buoyant (meaning little or no positive or negative in water buoyancy) in the water, and not substantially-heavier-than-water like conventional metal blades. Therefore soft appendages start spinning more easily and at slower speeds than a similar hard spinner blade which need to overcome their own in water weight and inertia. The appendages of the present invention naturally adapt to a slow start/stop retrieve as well as a first retrieve, making them useable on a much wider variety of lures than hard blades. A neutrally buoyant spinning appendage can spin at extremely slow speeds, such as during the freefall of a slowly sinking plastic worm weighted only by a hook. This type of slow speed motion has not been possible by a spinning blade. The invention creates significant motion that even a "curly tail" soft plastic lure cannot emulate. Curly tail lures must fall or be retrieved at a faster speed to make the tail wiggle.

The soft pliable appendages give slow moving lures such as plastic worms much more action, flash and vibration than presently available. For example, a rotating tail gives much more motion, eccentricity and vibration when compared to present curly-tail worms or minnow-type wiggling tails. A spinning tail continuously rotates 360° on retrieve or on the drop, flutters when stopped and moves completely freely, yielding a new type of action. Currently available tails and appendages cannot continuously traverse a 360° arc, but merely flap back and forth generally no more than 180°. When retrieved, a soft appendage shakes a worm or jig due to the spinning inertia of the rotating mass of the appendage, giving additional uncommon action. Such violent motion activates rattles during the retrieve, which is currently difficult, if not impossible with conventional soft plastic tails.

The forward, non-spinning portion of the lure assembly can deflect weeds and obstructions. By not spinning, the forward portion of the lure assembly does not accumulate weeds, but rather slides over weeds and acts as an "ice breaker." When the spinning appendage follows along behind the forward portion of the lure assembly, the weeds have already been mostly spread or deflected, allowing the aft appendage to continue spinning freely.

Because they can work with slower moving lures such as a jig, the soft appendages give the jig new properties similar to having two lures in one. The jig can be used as a spinnerbait to buzz over the tops of weeds and then can be used as a jig on the same cast when it approaches a downed tree. A weedless jig with a soft spinner trailer can be dropped into a sunken tree, worked slowly, and then retrieved out of it quickly like a spinnerbait. In contrast, with prior art lures, often two separate lures must be used to fish such as area: a jig to fish the tree and a spinnerbait to fish around the general area to cover surrounding weeds.

A non-spinning forward lure or lure portion that is soft plastic (such as a plastic worm) or hard (such as a jig) allows the hook to stay in the optimal place for hooking a fish and not spinning 360° every few seconds. Although it is possible to hook a fish on a spinning hook, it is not optimal. The hook should remain as upright as possible for optimum hooking potential at all times, which is possible with the present invention.

Figure 4B:
FIG. 4B is a side view of the appendage of FIG. 4A.
Figure 5B:
FIG. 5B is a side view of the appendage of FIG. 5A.
Figure 4A:
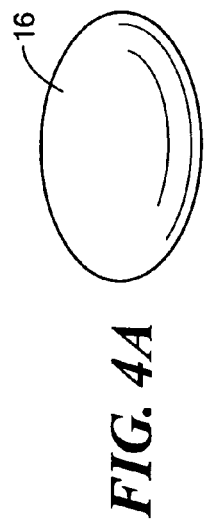
FIG. 4A is a plan view of a pliable appendage have a blade configuration.
Figure 5A:
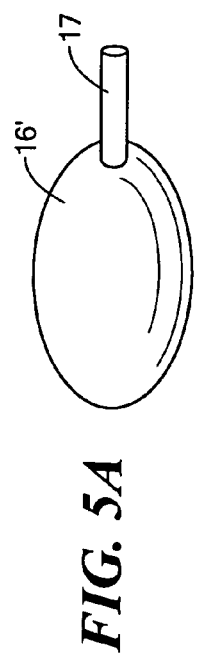
FIG. 5A is a plan view of a pliable appendage have a blade configuration and a connecting portion for a swivel mechanism.
Figure 6A:
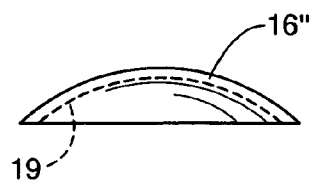
FIG. 6A is a side view of a concave blade pliable appendage.
Figure 6B:
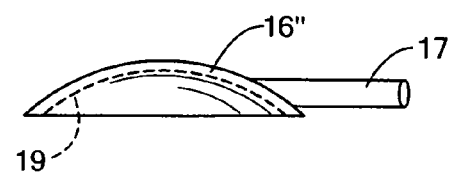
FIG. 6B is a side view of the appendage of FIG. 5A having a connection portion.
Figure 7A:
FIG. 7A is a side view of a blade pliable appendage having a connecting portion at an angle.
Figure 7B:
FIG. 7B is a side of a concave blade pliable appendage having a connecting portion at an angle.

A variety of configurations for the pliable appendage is contemplated by the present invention. For example, FIGS. 4A and 4B illustrate the appendage 16, which has a traditional blade configuration. FIGS. 5A and 5B illustrate an appendage 16' having a blade configuration including a weedless extension or connecting portion 17 into which the swivel mechanism can be embedded (described further below). As shown in FIGS. 6A and 6B, the blades 16" can include a concave side 19. The connecting portion 17' can be angled, for example 90°, to the body of the blade, as shown in FIGS. 7A and 7B, if desired to offset the appendage from the plane of the swivel, thereby maximizing the force of water on the blade to increase spinning speed.

Figure 8A:
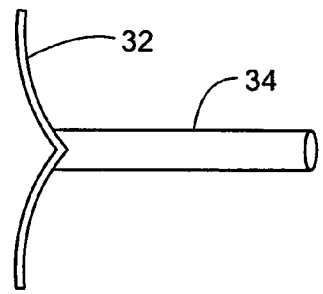
FIG. 8A illustrates a buzzer appendage.
Figure 8B:
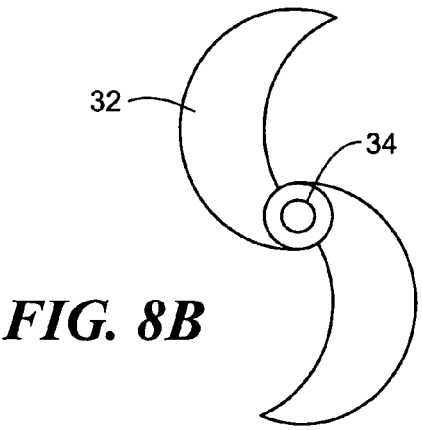
FIG. 8B illustrates a two-bladed buzzer appendage having a connecting portion.
Figure 8C:
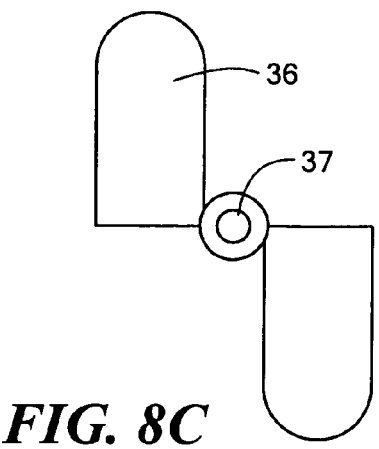
FIG. 8C illustrates a buzzbait blade configuration appendage having a connecting portion.
Figure 8D:
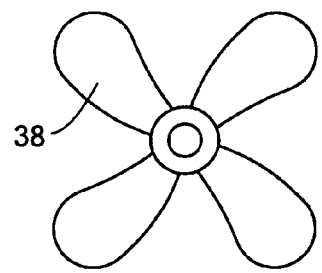
FIG. 8D illustrates a four-bladed propeller configuration appendage.

FIGS. 8A-8D illustrate buzzer or bladed spinning appendages. A two-bladed buzzer appendage 32 having a connecting portion 34 for the swivel mechanism is shown FIG. 8B. FIG. 8C shows a buzzbait blade configuration 36 with a connecting portion 37 for the swivel mechanism. FIG. 8D, shows a four-bladed propeller style appendage 38. A minnow or swimbait-style tail spinning appendage 70 is illustrated in FIGS. 9A and 9B.

Sickle-type spinning appendages 74 are shown in FIGS. 10A-10C. A connecting portion 76, 76' may be provided, either at an angle to the plane of the sickle blade (76) or in the plane of the sickle blade (76') pointing in the direction of travel of the lure.

For many lure presentations, the angler does not want the lure to spin in its entirety, just those appendages that give it lifelike action. This is especially true with the ultra-slow presentations that can be achieved with soft, zero-buoyancy blades. For example, a soft plastic crawfish imitation should not spin on its axis unnaturally. The claws or appendages, however, should have motion, while the body remains stationary and looks natural under water.

Figure 14A:
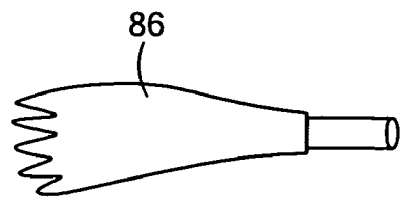
FIG. 14A illustrates a frog or lizard foot appendage.
Figure 14B:
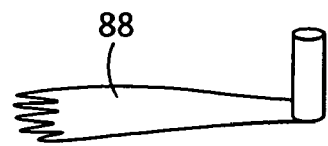
FIG. 14B illustrates a frog or lizard foot appendage with an angled connecting portion.
Figure 15:
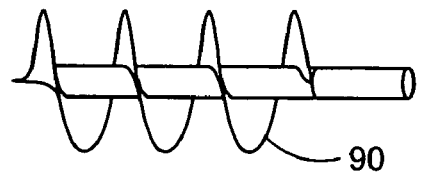
FIG. 15 illustrate a screw-like appendage.

FIGS. 11A and 11B illustrate a crawfish claw style appendage 78. As noted above, the connecting portion 79, 79' may be in plane or out of plane with the body of the appendage. A helical spinning appendage 82 is illustrated in FIG. 12. A slightly curved worm tail 84 is shown in FIG. 13A. FIG. 13B illustrates multiple in-line spinning appendages 84'. Each appendage spins freely, giving a realistic (life like) worm- or snake-like appearance to the lure assembly. FIG. 13C illustrates a further arrangement or variation of multiple spinning appendages 84". FIGS. 14A and 14B illustrate appendages configured as frog feet 86 or lizard feet 88. A screw-like form 90 is illustrated in FIG. 15.

Figure 16:
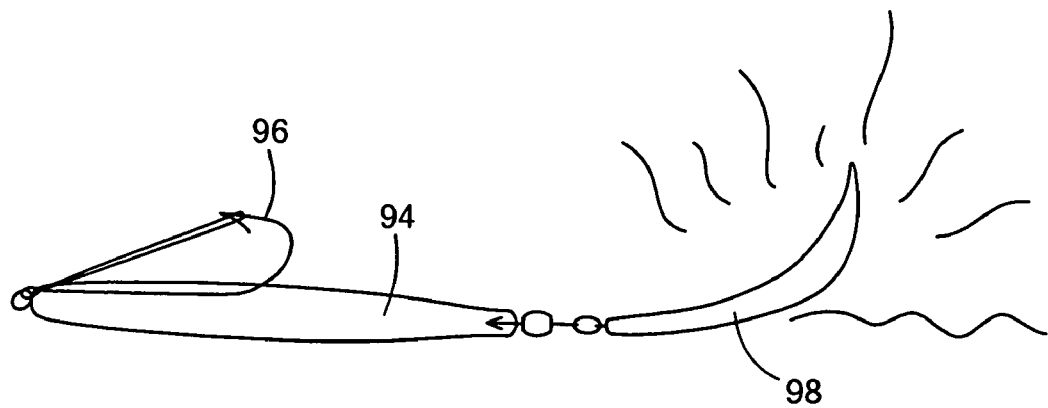
FIG. 16 illustrates a soft worm lure with hook and a curved spinning tail appendage.
Figure 17:
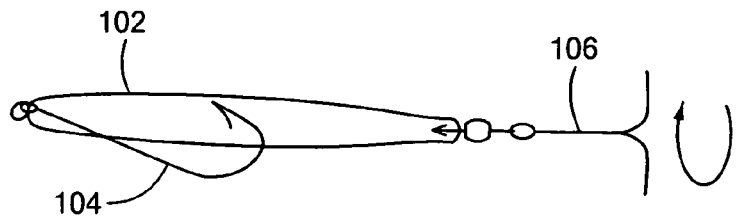
FIG. 17 illustrates a soft worm lure with hook and spinning buzzer tail appendage.
Figure 18:
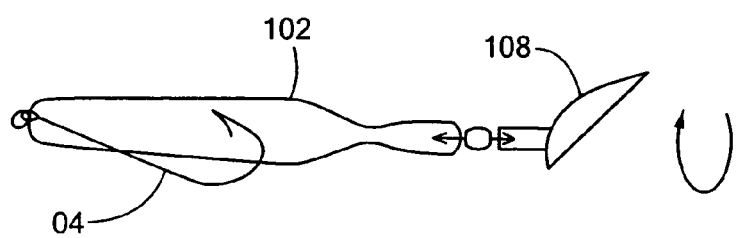
FIG. 18 illustrates a soft worm lure with hook and blade appendage.

A soft worm lure 94 with hook 96 is illustrated with a curved spinning tail appendage 98, shown in FIG. 16. When pulled on the surface of the water, the spinning tail creates a splash. FIG. 17 illustrates a soft worm lure 102 with embedded hook 104 and pliable spinning buzzer tail appendage 106. FIG. 18 is similar with a blade appendage 108.

Figure 19:
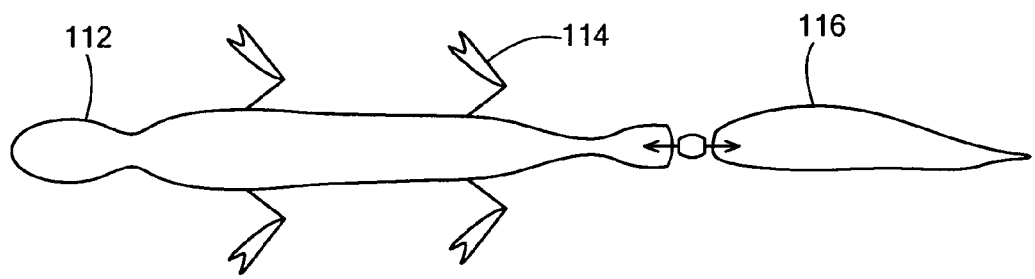
FIG. 19 illustrates a lizard lure with spinning feet and tail appendages.
Figure 20:
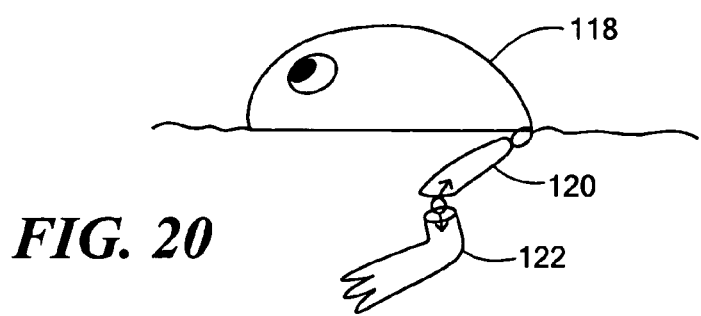
FIG. 20 illustrates a frog lure with legs having spinning feet appendages.
Figure 21:
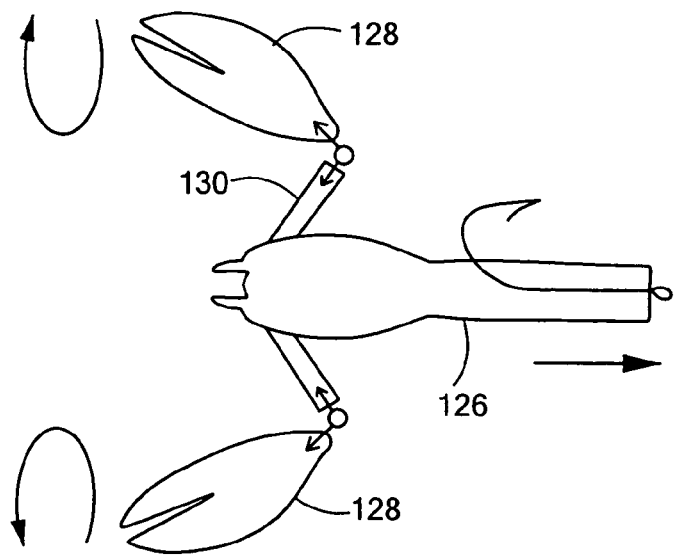
FIG. 21 illustrates a crawfish lure having spinning claw appendages attached to arms.
Figure 22:
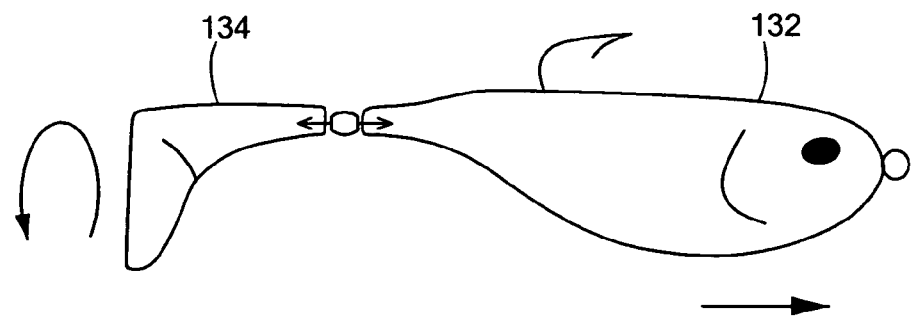
FIG. 22 illustrates a fish or swimbait minnow having a spinning tail appendage.
Figure 23:
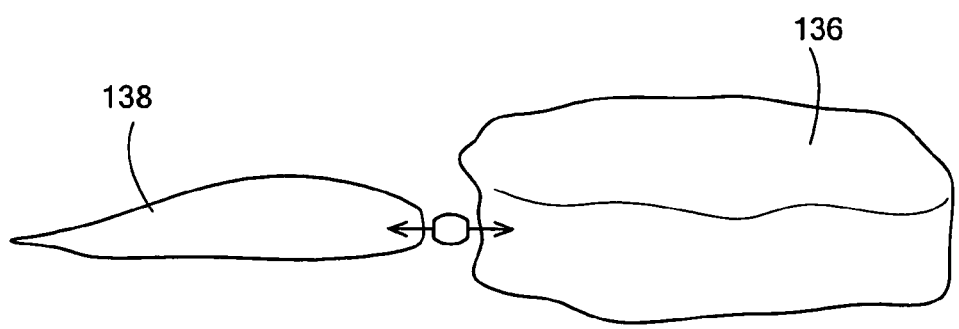
FIG. 23 illustrates a pork chunk lure with trailing appendage.

FIG. 19 illustrates a lizard lure 112 with four spinning feet appendages 114 and/or a spinning tail appendage 116. FIG. 20 illustrates a frog lure 118 with legs 120 having spinning feet appendages 122. Pulling the frog lure along the water surface spins the feet appendages and extends the legs, which recoil. FIG. 21 illustrates a crawfish lure 126 having spinning claw appendages 128 attached to arms 130. The claws spin and the arms deflect and then retract upon pulling and stopping the line. FIG. 22 illustrates a fish or swimbait minnow 132 having a spinning tail appendage 134 that spins when the fish is pulled through the water. FIG. 23 illustrates a pork chunk 136 or other soft lure or trailer to another lure having a pliable spinning appendage 138 according to the present invention.

Figure 24:
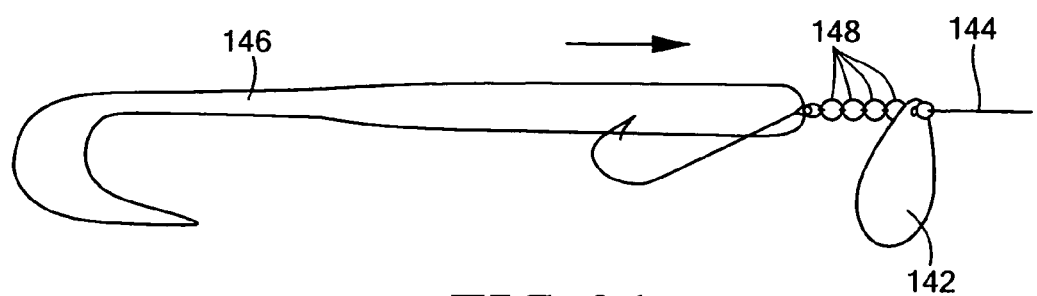
FIG. 24 illustrates a spinning appendage retained on a fishing line.

In FIG. 24, a pliable spinning appendage 142 is retained on the fishing line 144. The appendage is spaced from the lure 146, which may be hard or soft, by beads 148 that provide spacing between the spinning appendage and the non-spinning lure. The appendage spins ahead of the lure to attract fish. The line serves as the spinner shaft.

Figure 25:
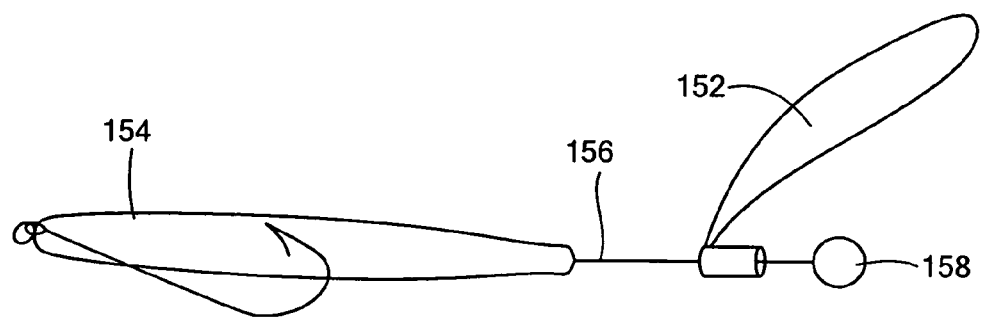
FIG. 25 illustrates a soft worm lure with rotating tail blade appendage.

FIG. 25 illustrates an embodiment in which a pliable appendage 152 forms a rotating tail blade for a lure 154 configured as a soft worm. The appendage rotates about a narrow rear shaft portion 156 of the lure. A stop element 158 of plastic or other material on the end of the lure prevents the appendage from parting from the shaft portion of the lure about which it spins. The shaft portion may be made of a plastic or other material.

Soft appendages can be Texas-rigged weedless so that a hook can be affixed to the appendage itself. The ability to have a hook on the attractive element of the lure itself is a great advantage to the angler. Fish that actually strike the appendage can now be hooked and caught. In contrast, fish often strike conventional blades, but are not caught. Fish can even be spooked by the hardness and impact of a metal blade.

Figure 26:
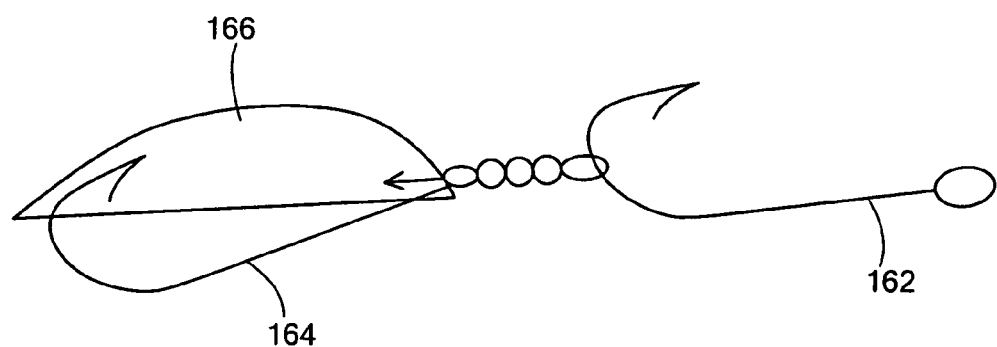
FIG. 26 illustrates a jig and appendage with a Texas-rigged hook.
Figure 27:
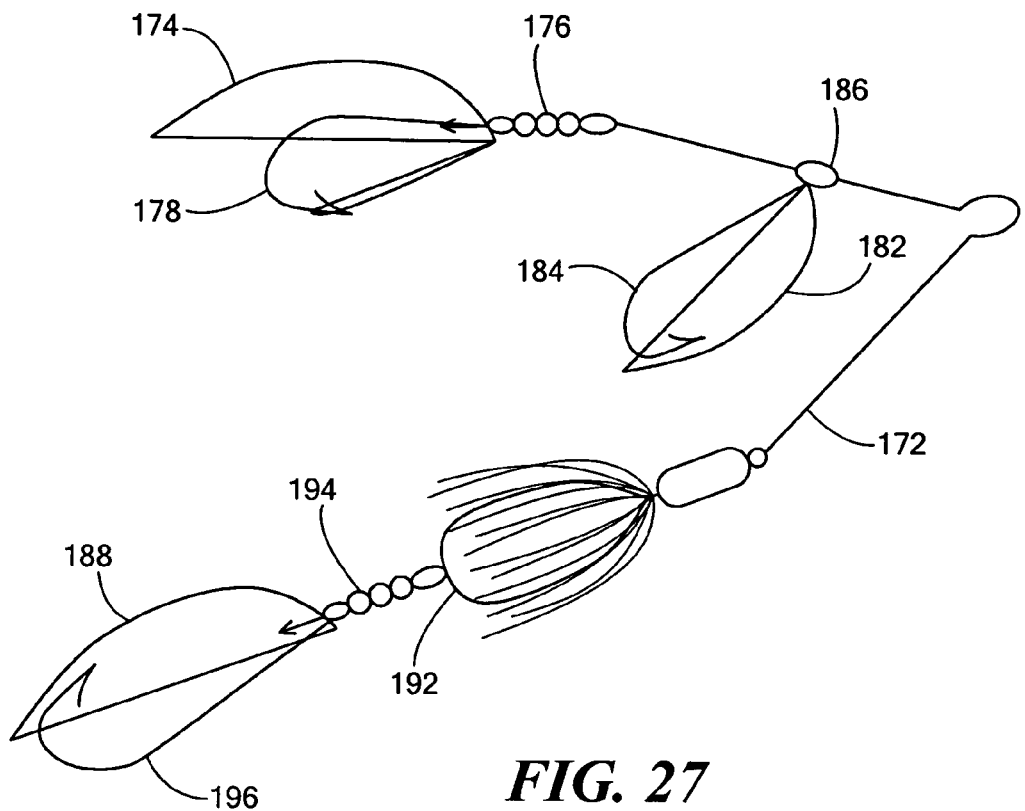
FIG. 27 illustrates a spinnerbait with three types of appendages having embedded hooks.

FIG. 26 illustrates a jig 162 with a Texas-rigged hook 164 in which the hook point is buried in the appendage 166. FIG. 27 illustrates spinnerbait 172 with three types of appendages having embedded hooks. The appendage 174 is attached with any suitable swivel mechanism 176 and includes a weedless hook 178. The appendage 182 includes a Texas-rigged hook 184 and is mounted in-line with a clevis 186. The appendage 188 trails a lure 192 from any suitable swivel mechanism 194 and includes a Texas-rigged hook 196.

Figure 28:
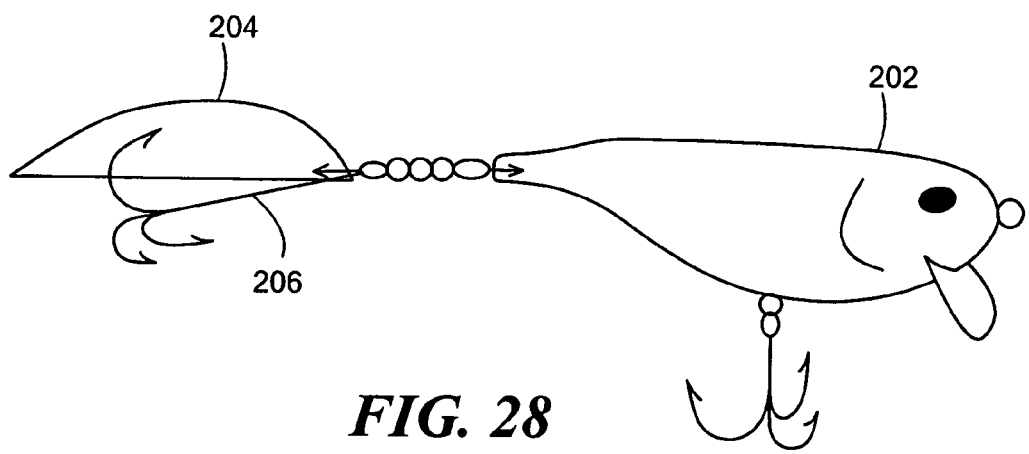
FIG. 28 illustrates a crank bait having a trailing appendage with treble hook.
Figure 29:
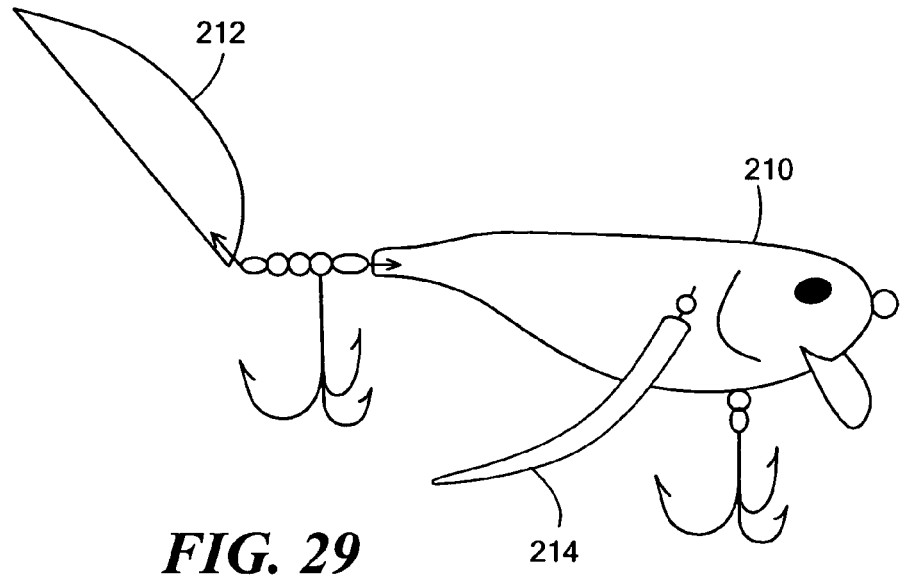
FIG. 29 illustrates a plug or crank bait having a trailing appendage and fin appendage.
Figure 30:
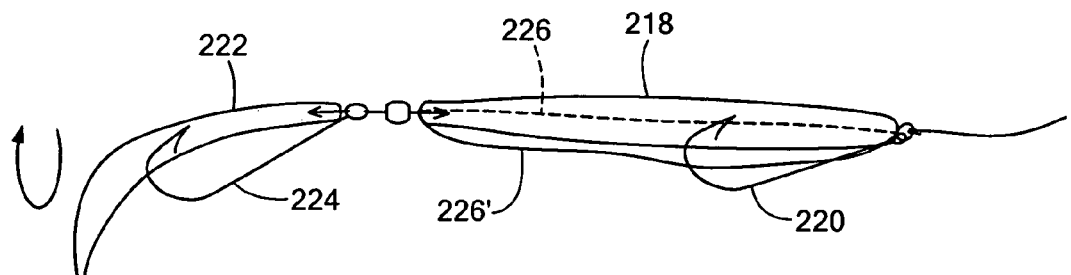
FIG. 30 illustrates a soft worm with trailing curved tail appendage with embedded hook.

In other embodiments, FIG. 28 illustrates a crank bait 202 having a trailing pliable appendage 204 with an embedded treble hook 206. FIG. 29 illustrates a plug or crank bait 210 having a trailing pliable spinning appendage 212 and a curved spinning appendage 214 that acts as a fin or wing. FIG. 30 illustrates a plastic worm 218 with embedded hook 220 and a trailing curved tail spinning appendage 222, also having an embedded hook 224. An interior line 226 or exterior line 226' connected to the first hook 220 allows a fish to be caught on the tail hook 224.

Figure 31:
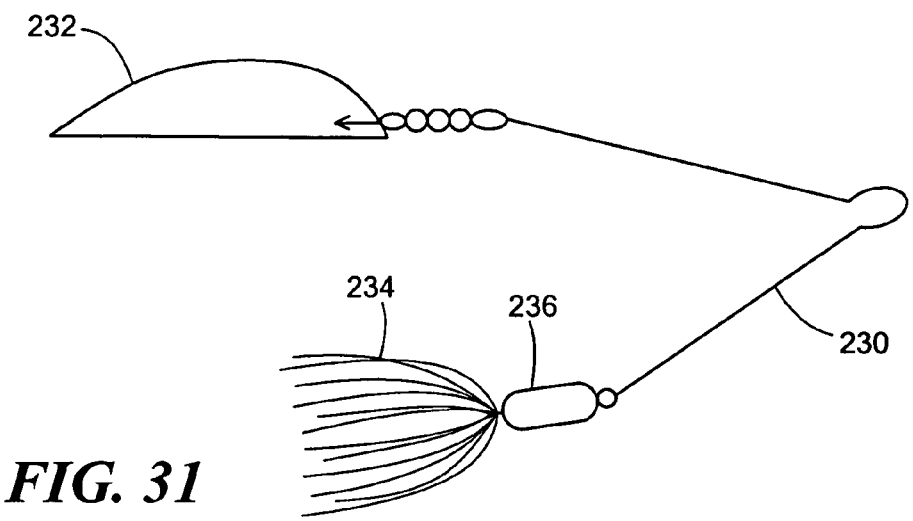
FIG. 31 illustrates a spinnerbait with a spinning appendage.
Figure 32:
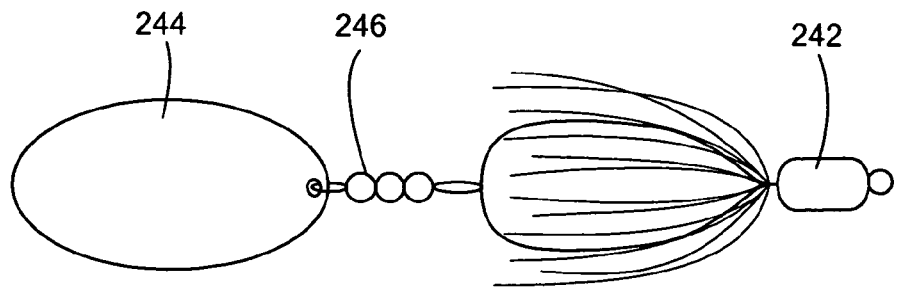
FIG. 32 illustrates a jig with a trailing spinning appendage.
Figure 33:
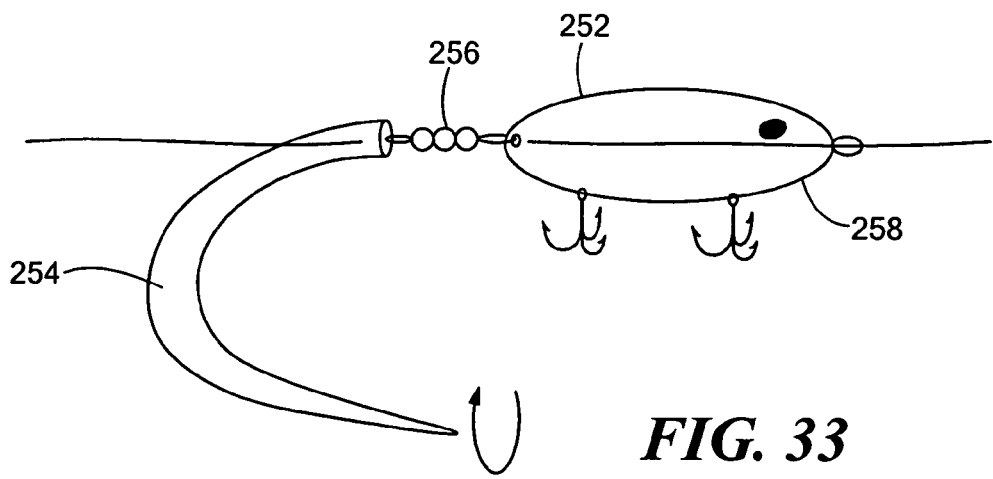
FIG. 33 illustrates a topwater lure with a trailing appendage.
Figure 34:
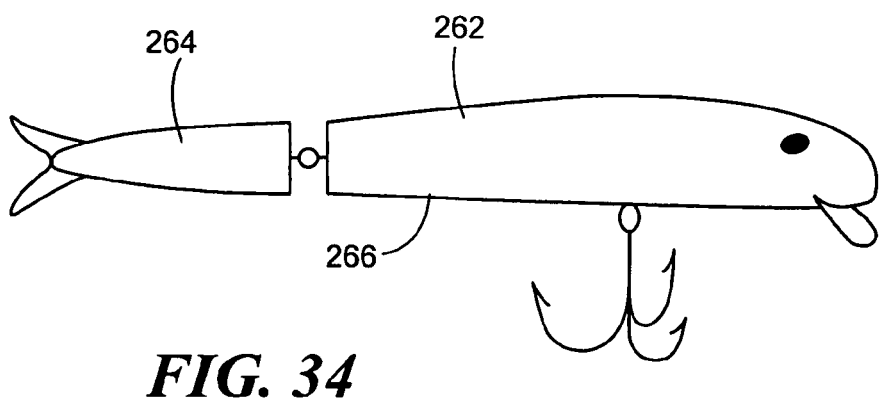
FIG. 34 illustrates a plug or shallow running jerkbait having a pliable spinning appendage rear portion.

FIG. 31 illustrates a spinnerbait 230 with a pliable spinning appendage 232 and a skirt 234 and weighted head 236. FIG. 32 illustrates a jig 242 with a trailing spinning appendage 244 attached with any suitable swivel mechanism 246 to a weighted jighead with skirt. FIG. 33 illustrates a topwater lure 252 having a curved tail spinning appendage 254 attached with any suitable swivel mechanism 256 to a non-spinning lure body 258. As the tail spins, it creates a topwater commotion like a snake or fish. FIG. 34 illustrates a plug or shallow running jerkbait 262 in which the rear portion 264 is a pliable spinning appendage and the front portion is a hard body 266. The front portion of the lure provides stability and direction as well as diving ability with the forward lip.

Inserts 270, 276 of metal, weights, or reflective foil can be insert-molded in vinyl plastisol-injected appendages 272 for extra flash or weight. See FIGS. 35 and 36. Reflective or holographic inserts can decorate the appendage for increased flash or color in the water. By adding weight or metal to the appendage, the spinning inertia can be increased to "shake" the lure more violently than a simple soft vinyl blade. An insert-molded metal appendage sealed with an vinyl plastisol covering can retain the fish-attracting properties of a soft appendage, while mitigating the hard, fish-repelling feel of a convention spinning metal blade, should a fish strike the appendage. A wire 278 can be insert molded or impaled into an appendage to use as an attaching point to a swivel, or for structural uses such as bending to give the appendage unique or unusual characteristics. See FIG. 37.

Soft appendages can be impregnated with salt or other scents. In addition, the rotating motion disperses the scents much more quickly than a lure body of a soft plastic lure moving through the water. The appendage disperses the scent centrifugally and presses the scent out of the plastic. The appendage also traverses much more water than the linear retrieve distance of a lure because it spins. With each rotation of the appendage, it traverses much more water than the distance it is retrieved, therefore increasing the water flow past the scent-impregnated plastic, increasing the dispersion gradient.

A variety of swivel mechanisms can be employed with the pliable appendages of the present invention. Preferably, the swivel mechanism spins freely and is loose enough to quickly point the spinning object into the flow of the water.

In the embodiment of FIGS. 1 and 2, the swivel mechanism 18 comprises a shaft 24 having a barbed element(s) 26 embedded in the lure 12 and another shaft 28 with barbed element(s) 30 embedded in the blade 16. The lure shaft has a widened portion or head 32 at or near the end that protrudes from the lure, and the blade shaft has an eye 34 at the end that protrudes from the blade. The eye is retained on the lure shaft by the head. In this manner, the eye can freely rotate 360° about the shaft, allowing the blade to spin with respect to the lure.

FIG. 3 illustrates another embodiment of a swivel mechanism 18' in which the blade shaft 28' is bent so that the shaft includes a shaft portion embedded in the blade and offset from the axis of the lure shaft. This swivel mechanism reduces the tendency of the lure to spin. FIG. 3 also illustrates a weight 22 on the hook 14 with is offset from the lure body, also reducing the tendency of the lure to spin.

FIG. 38 illustrates another embodiment of a swivel mechanism 40 that employs a modified Crane swivel. This swivel mechanism includes a hollow barrel 42 with a narrowed opening on one end. A shaft 44 with a barbed element(s) 46 extends from the barrel to be embedded in the non-spinning lure 48. The lure is preferably a soft plastic for easy anchoring. A spinning shaft or stem 50 protrudes through the open end of the barrel. The head 52 of the shaft within the barrel is enlarged or expanded, such as by crimping, sufficiently to retain the head within the barrel while allowing 360° rotation of the shaft about its axis. In another embodiment, the head can be replaced with a conventional ball bearing assembly as in traditional (commonly called Sampo) ball bearing swivels. The shaft has a barbed element(s) 54 on its opposite end to be embedded in the pliable spinning appendage 56. The spinning appendage may include a connecting portion 58 shaped, for example, like a rod or pipe. This connecting portion is smaller in diameter than the adjacent portion of the lure and/or the leading portion of the swivel mechanism. The shafts and barbed element(s) may be formed of any suitable material, such as a metal or plastic material or combination thereof. Plastic materials, such as nylon or PTFE (such as TEFLON®), can be formed with very low coefficients of friction, especially when submerged in water. A thin metal shaft, for example, between 0.005 and 0.1 inch, with a plastic or metal head is suitable and has been found to spin freely. Metal-on-slippery plastic spins well and adds little mass, which allows the neutrally buoyant or zero gravity blade to spin at the slightest water flow.

By anchoring the leading end of the swivel mechanism in the non-spinning lure 48, the spinning portion of the swivel mechanism is hidden from weeds or other elements that might otherwise catch in the spinning portion. When traveling through the water, the weeds are moved out of the way by the non-spinning lure, like an "ice breaker" traveling through ice. If a weed slides off the lure onto the spinning shaft (or the connecting portion of the pliable appendage) the weed has already passed the actual hidden hard portion of the spinning shaft and may touch the soft appendage or its connecting portion. Therefore, weeds and obstructions are not forced into the spinning shaft where it connects to the swivel, as in traditional lures, since it is pointing away from the water flow at all times and is hidden by the leading edge of the lure. Weeds may touch the lure and may be deflected onto the spinning attachment, but the blade or appendage is pliable and does not trap weeds with hard edges. Weeds more readily slide off the pliable slippery plastic or may easily by removed by a quick pull of the line.

The soft lure 48 is preferably formed with a recessed region 60 to accept the insertion of the swivel mechanism, as also shown in FIG. 39. This recessed region protects the swivel mechanism by being wider than the spinning shaft and deflecting weeds before they come in contact with the spinning shaft. This region may optionally incorporate a soft flange around the opening to further assist in weed deflection. Also, insertion of the swivel mechanism into this recess does not deflect or distort the plastic of the lure.

The lure assembly should be sufficiently loosely configured that the spinning appendage quickly points into the flow of the water. In prior art metal Crane swivel mechanisms and ball bearing swivels, such looseness is achieved with small rings loosely attached to eyes of the swivel so that the swivel easily follows the direction of line pull through the water. In the present invention, the lure 48 and the appendage 56 can be formed with flexible portions that provide sufficient flexibility while removing this function from the swiveling hardware. The flexible portions deflect and point the swivel and the spinning blade into the water flow. In the embodiment illustrated, the flexible portion in the lure 48 is formed as a thinner or weakened region 62. This flexible region makes the tail orientation more susceptible to immediate changes in the direction of water flow, allowing the tail to turn quickly in the proper direction. The flexible region also adds a wiggling motion to the tail of the lure, leading to a more exaggerated wiggling motion when combined with the spinning of the appendage. The connecting portion 58 of the appendage can be formed to be a flexible portion.

Figure 40:
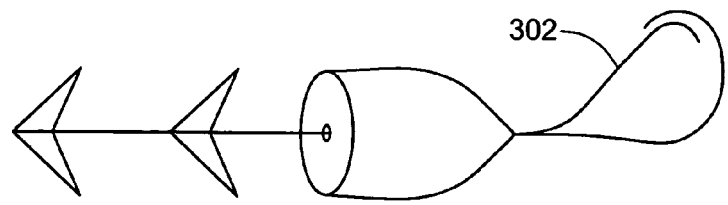
FIG. 40 is a further embodiment of a swivel mechanism having a clip on one end.
Figure 41:
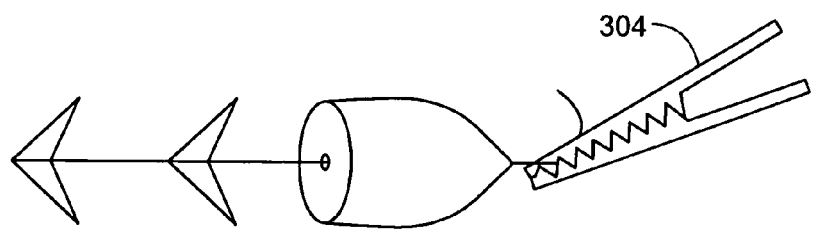
FIG. 41 is a further embodiment of a swivel mechanism having an alligator clip on one end.
Figure 42:
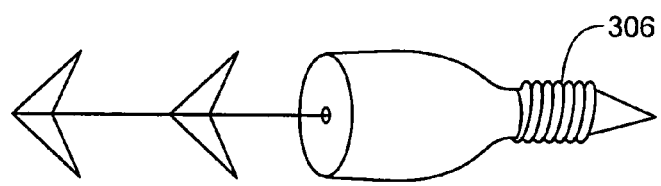
FIG. 42 is a further embodiment of a swivel mechanism having a screw on one end.
Figure 43:
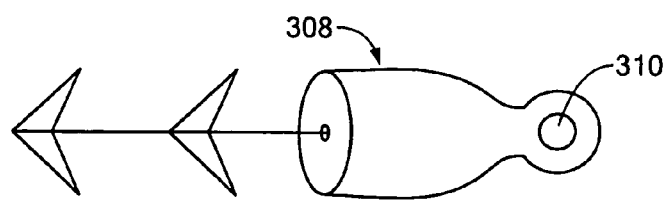
FIG. 43 is a further embodiment of a swivel mechanism having a hole on one end.
Figure 44:
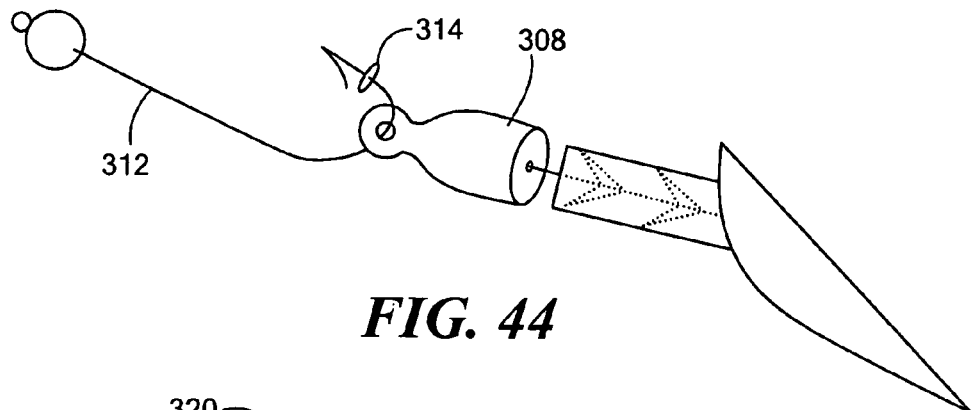
FIG. 44 illustrates the swivel mechanism of FIG. 43 on a hook.

In other embodiments, the swivel mechanism can be attached to a hard lure. In this case, the leading edge of the swivel mechanism can include a loose attachment to the lure, such as with a clip 302, 304 (FIGS. 40 and 41) or a screw 306 (FIG. 42), to provide the desired flexibility. In FIGS. 43 and 44, the swivel mechanism 308 has a hole 310 therethrough that slips over a hook 312 of a jig. The swivel is loosely connected to the jig and is retained on the hook by a plastic retainer 314 which stops the collar of the swivel from slipping back over the barb of the hook and becoming lost.

Figure 45:
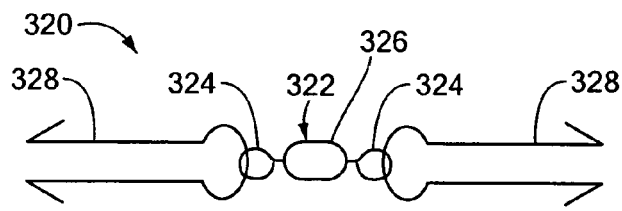
FIG. 45 is a further embodiment of a swivel mechanism having clips for a lure and an appendage.
Figure 46:
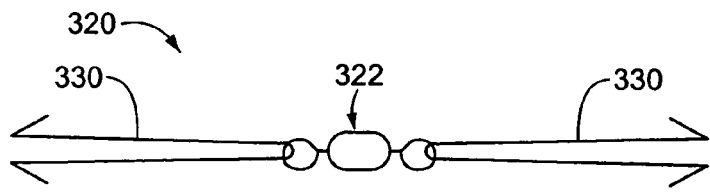
FIG. 46 is a further embodiment of a swivel mechanism having clips for a lure and an appendage.
Figure 47:
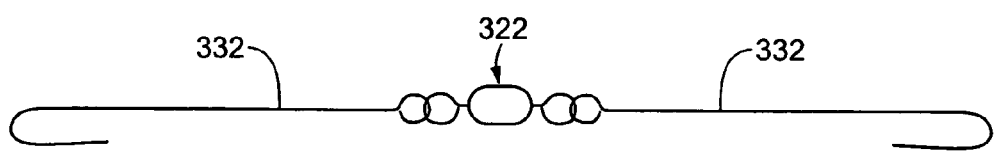
FIG. 47 is a further embodiment of a swivel mechanism having hooks for a lure and an appendage.
Figure 48:
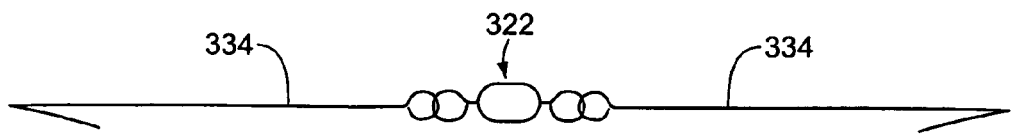
FIG. 48 is a further embodiment of a swivel mechanism having hooks for a lure and an appendage.

Other swivel mechanisms with a variety of fastener mechanisms can be used. FIGS. 45 and 46 illustrate a swivel mechanism 320 incorporating a Crane swivel 322 with eyes 324 protruding from a central barrel 326. Clips 328, 330 on the eyes are insertable into a pliable spinning appendage and a soft non-spinning lure. FIGS. 47 and 48 illustrate a Crane swivel 322 with hooks 332 that attach to or insert into the appendage and lure. These clips and hooks are suitable for attaching a soft appendage to a soft lure or hard lure.

Figure 49:
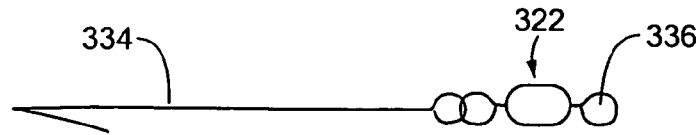
FIG. 49 is a further embodiment of a swivel mechanism having a hook and an eye on opposite ends.
Figure 50:
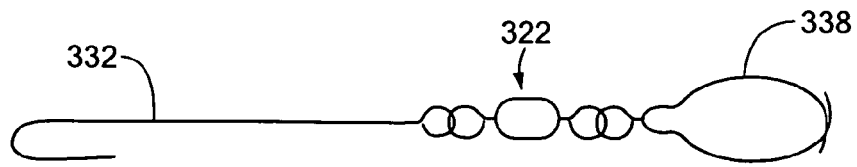
FIG. 50 is a further embodiment of a swivel mechanism having a hook and a clip on opposite ends.
Figure 51:
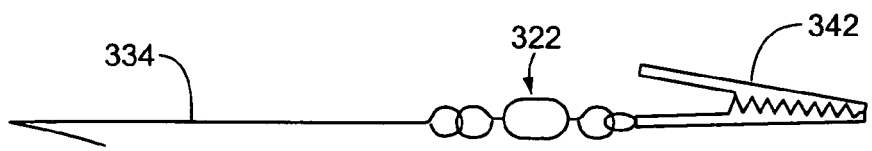
FIG. 51 is a further embodiment of a swivel mechanism having a hook and an alligator clip on opposite ends.
Figure 52:
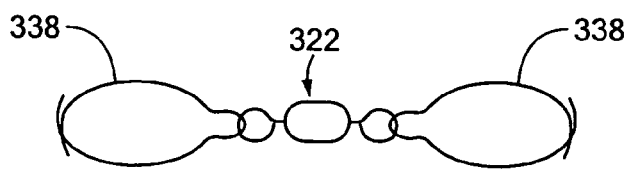
FIG. 52 is a further embodiment of a swivel mechanism having clips on opposite ends.
Figure 53:
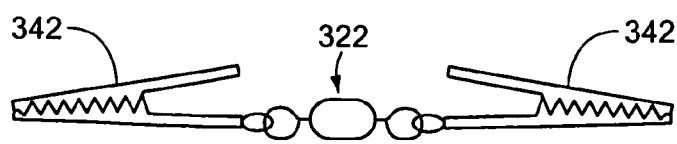
FIG. 53 is a further embodiment of a swivel mechanism having clips on opposite ends.
Figure 54:
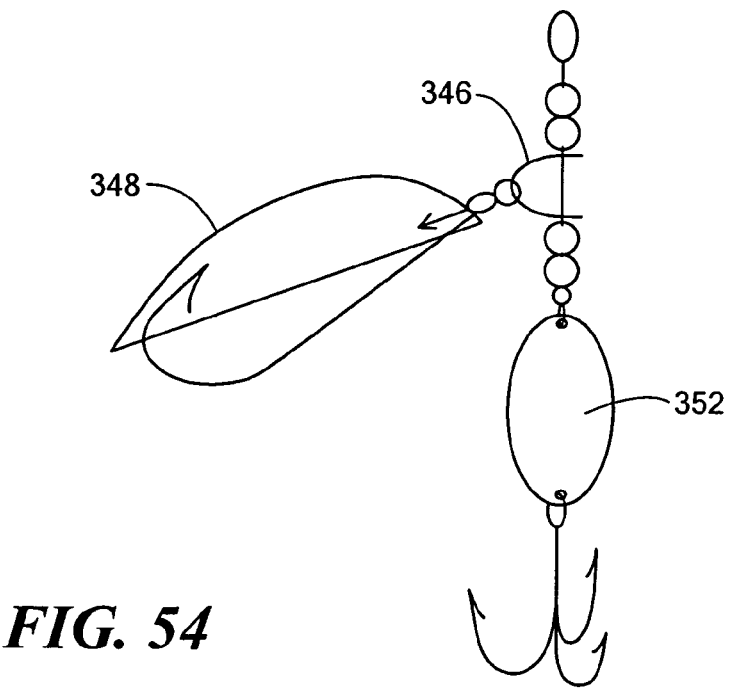
FIG. 54 is a further embodiment having an appendage attached with a clevis.

FIG. 49 illustrates a Crane swivel 322 with a hook 334 on one eye for attachment to a spinning appendage. The opposite eye 336 attaches to a conventional fish hook or jig. In FIG. 50, a clip 338 is provided for attachment to a lure. FIG. 51 illustrates an alligator clip 342 for attachment to a lure. In FIG. 52, a clip 338 is provided for attachment to the appendage and another clip 338 for attachment to the lure. In FIG. 53, the swivel mechanism incorporates two alligator clips 342. A clevis attachment 346 is illustrated in FIG. 54 to attach a pliable spinning appendage 348 to a conventional in-line spinner 352.

Figure 55:
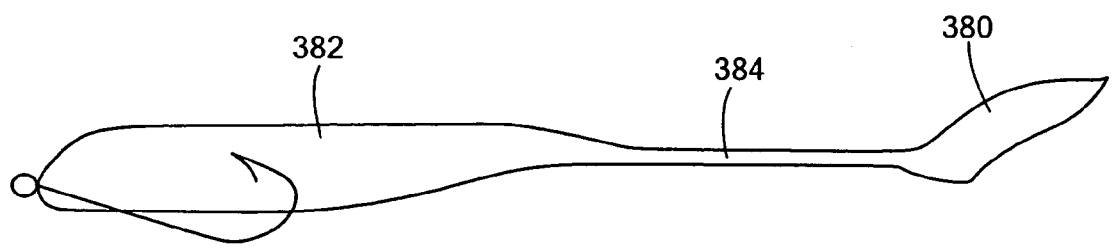
FIG. 55 is a further embodiment with a thin flexible appendage acting as a swivel.

In a further aspect of the invention, soft blades can have no swivel to achieve a 360 degree spinning axis as shown in FIG. 55. The spinning blade 380 can be attached to a hard or soft lure 382 by a relatively thin elongated portion 384 of plastic or pliable material as a strip or filament. Such soft blades can spin several dozen times before the connecting plastic material winds up like a rubber band on a toy airplane. Once the lure stops, the material unwinds, ready to be wound up again. A no-swivel spinning blade is especially useful as part of a plastic worm tail, or a trailer to a stop-and-start lure like a jig. The unwinding action between lure motions, while the lure is stationary, has attractive qualities to fish of its own, simulating movement while the lure is temporarily stopped. Such an attachment may be used as the swivel in many of the above embodiments.

The invention is not to be limited by what has been particularly shown and described, except as indicated by the appended claims.

What is claimed is:
1. A fishing lure assembly comprising:
   a fishing lure attachable to a fishing line with no spinning with respect to the fishing line;
   a pliable appendage; and
   a swivel mechanism spinnably attaching the pliable appendage to the lure, the swivel mechanism comprising:
      a hollow barrel element having an opening on one end and a fastening element on an opposite end, the fastening element fastened to the fishing lure,
      a shaft extending through the opening in the barrel element, a head on one end of the shaft retained within the barrel element, the shaft spinnable with unrestricted 360° rotation about an axis of the shaft with respect to the barrel element, and a barbed element on the opposite end of the shaft and aligned with the axis of the shaft, the barbed element inserted into the pliable appendage so that the pliable appendage is spinnable with unrestricted 360° rotation about the axis of the shaft, and
      wherein the fishing lure has a recess at one end, the barrel element disposed within the recess.

2. The fishing lure assembly of claim 1, wherein the pliable appendage is comprised of a material that is compressible and deformable by the jaws of a fish.

3. The fishing lure assembly of claim 1, wherein the pliable appendage is comprised of a material that is compressible and deformable between two fingers of an average human hand.

4. The fishing lure assembly of claim 1, wherein the pliable appendage is comprised of a plastisol, cyberflex, foam, or pork rind.

5. The fishing lure assembly of claim 1, wherein the pliable appendage is at least close to neutrally buoyant in water.

6. The fishing lure assembly of claim 1, further comprising an insert disposed within the pliable appendage.

7. The fishing lure assembly of claim 6, wherein the insert comprises a reflective insert, a holographic insert, a weight, or a wire.

8. The fishing lure assembly of claim 1, wherein the pliable appendage includes a scent.

9. The fishing lure assembly of claim 1, wherein the pliable appendage has a bladed configuration.

10. The fishing lure assembly of claim 9, wherein the bladed configuration comprises a blade having a convex side and a flat side, a blade having a convex side and a concave side, multiple blades, a buzzer configuration, or a buzzbait configuration.

11. The fishing lure assembly of claim 1, wherein the pliable appendage has a minnow configuration, a swimbait configuration, or a worm configuration.

12. The fishing lure assembly of claim 1, wherein the pliable appendage has a sickle configuration, a screw configuration, or a helical configuration.

13. The fishing lure assembly of claim 1, wherein the pliable appendage has a claw configuration, a foot configuration, or a tail configuration.

14. The fishing lure assembly of claim 1, wherein the fishing lure comprises a soft lure.

15. The fishing lure assembly of claim 1, wherein the fishing lure comprises a hard lure.

16. The fishing lure assembly of claim 1, wherein the fishing lure comprises a fish, crankbait, lizard, frog, or crawfish, and the pliable appendage comprises a limb or tail of the fish, crankbait, lizard, frog, or crawfish.

17. The fishing lure assembly of claim 1, wherein the swivel mechanism provides rotation of the pliable appendage in line with the fishing lure.

18. The fishing lure assembly of claim 1, wherein the swivel mechanism provides rotation of the pliable appendage out of plane with the fishing lure.

19. The fishing lure assembly of claim 1, wherein the swivel mechanism provides rotation of the pliable appendage offset from the fishing lure.

20. The fishing lure assembly of claim 1, wherein the pliable appendage is mounted by the swivel mechanism to rotate about a tail portion or nose portion of the fishing lure.

21. The fishing lure assembly of claim 1, wherein the pliable appendage includes a connecting portion to which the swivel mechanism is attached.

22. The fishing lure assembly of claim 21, wherein the connecting portion comprises a cylinder or pipe.

23. The fishing lure assembly of claim 1, further comprising a hook embedded within the pliable appendage.

24. The fishing lure assembly of claim 1, wherein the fishing lure comprises a jig including a hook, and the pliable appendage is mounted by the swivel mechanism to the hook.

25. The fishing lure assembly of claim 1, wherein the pliable appendage trails the fishing lure.

26. The fishing lure assembly of claim 25, wherein the fishing lure diverts objects from tangling in the swivel mechanism.

27. The fishing lure assembly of claim 1, wherein the pliable appendage is mounted in advance of the fishing lure.

28. The fishing lure assembly of claim 1, further comprising a spinnerbait, the pliable appendage mounted to the spinnerbait.

29. The fishing lure assembly of claim 1, further comprising additional pliable appendages spinnably attached to the fishing lure or the pliable appendage.

30. The fishing lure assembly of claim 1, wherein the swivel mechanism provides unrestricted 360° rotation of the pliable appendage with respect to the fishing lure.

31. The fishing lure assembly of claim 1, wherein the shaft is comprised of a metal or a plastic material, and the head is comprised of a metal or a plastic material.

32. The fishing lure assembly of claim 1, wherein the shaft is attached to a connecting portion of the pliable appendage.

33. The fishing lure assembly of claim 32, wherein the connecting portion is more flexible than a remainder of the pliable appendage.

34. The fishing lure assembly of claim 1, wherein the fastening element of the barrel element comprises a barbed element inserted into the fishing lure.

35. The fishing lure assembly of claim 1, wherein the fastening element of the barrel element comprises an opening insertable over a hook of the fishing lure.

36. The fishing lure assembly of claim 1, wherein the fastening element of the barrel element comprises a clip or a screw.

37. The fishing lure assembly of claim 1, wherein the fishing lure comprises a soft material having a recess at one end, the barrel element disposed within the recess.

* * * * *

UNITED STATES PATENT AND TRADEMARK OFFICE
CERTIFICATE OF CORRECTION

| | | |
|---|---|---|
| PATENT NO. | : 7,895,789 B2 | Page 1 of 1 |
| APPLICATION NO. | : 11/472821 | |
| DATED | : March 1, 2011 | |
| INVENTOR(S) | : Alexander G. Langer | |

It is certified that error appears in the above-identified patent and that said Letters Patent is hereby corrected as shown below:

Column 12, claim 37, line 25-26, "a recess at one end, the barrel element disposed within the recss." should read -- a narrowed portion, wherein the narrowed portion provides additional flexibility of the fishing lure. --.

Signed and Sealed this
Sixteenth Day of October, 2012

David J. Kappos
*Director of the United States Patent and Trademark Office*